Nov. 3, 1953          E. L. HAYNIE          2,657,757
THROTTLE SAFETY ATTACHMENT
Filed Nov. 24, 1950
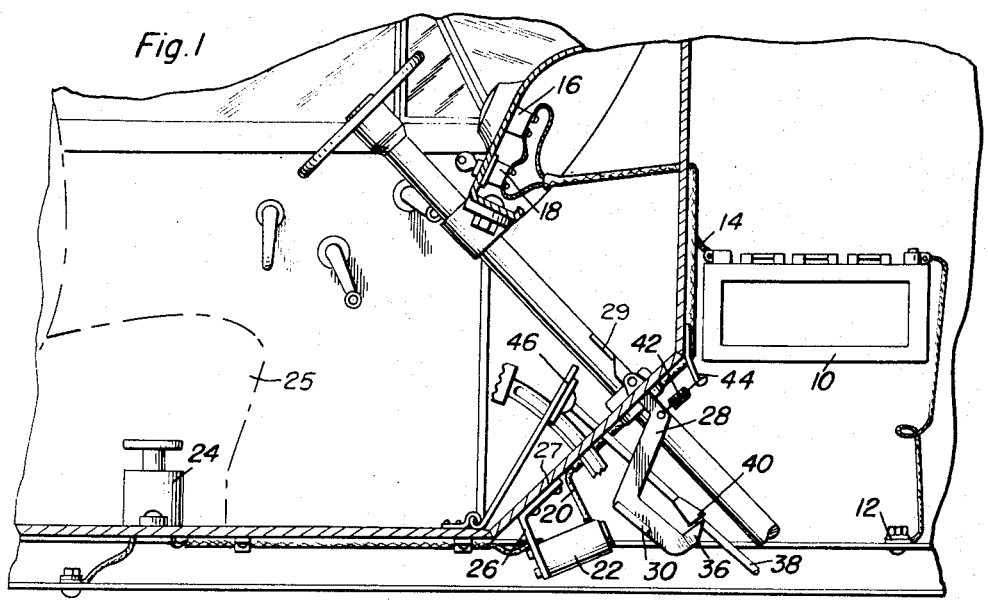
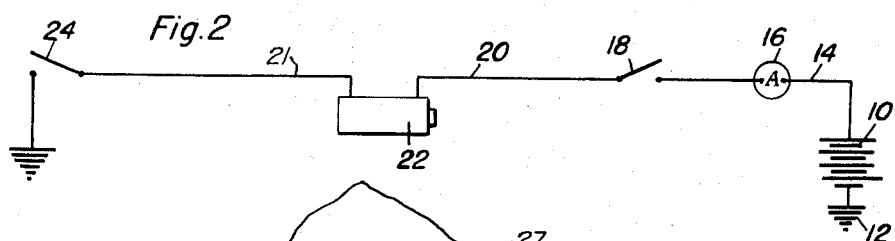
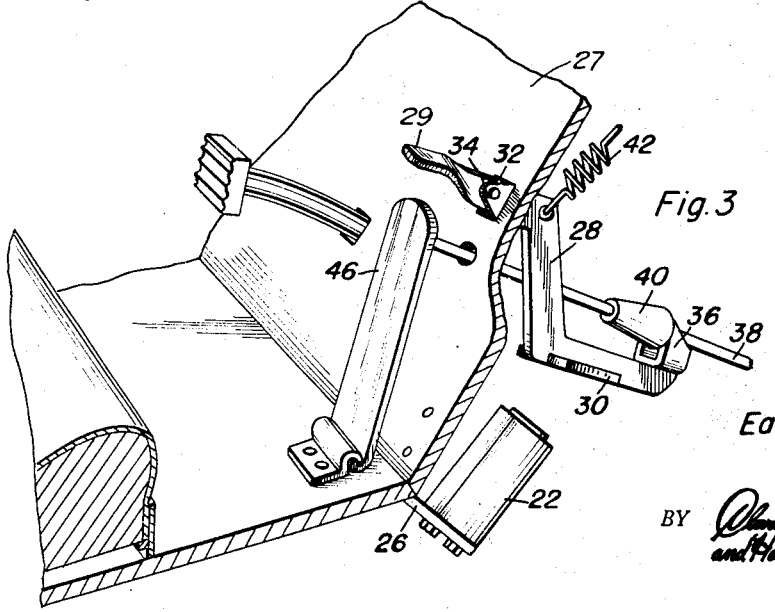
Earl L. Haynie
INVENTOR.

Patented Nov. 3, 1953

2,657,757

UNITED STATES PATENT OFFICE 2,657,757

THROTTLE SAFETY ATTACHMENT

Earl L. Haynie, Berwyn, Ill.

Application November 24, 1950, Serial No. 197,449

1 Claim. (Cl. 180—82)

This invention relates to improvements in attachments for vehicles.

An object of this invention is to provide an attachment for a vehicle, particularly an automobile, for holding the foot operated throttle control in a locked condition so that it cannot accidentally or inadvertently be actuated by an unauthorized person, for example a child.

It is not infrequent that an automotive vehicle is left with the engine idling while the operator for a moment leaves the vehicle. Automobiles of today are provided with certain automatic transmissions and fluid couplings of one type or another whereby it is necessary only to exert a pressure on the accelerator pedal to cause movement of the vehicle. Under these conditions an attachment to prevent an unauthorized depression of the accelerator pedal is of importance.

Ancillary objects and features of importance will become apparent in following the description of the illustrated form of the invention.

In the drawings:

Figure 1 is a fragmentary sectional view shown schematically, of a vehicle having the assembly of the attachment therein;

Figure 2 is a wiring diagram, suggested to be used with the attachment; and,

Figure 3 is a fragmentary perspective view of a part of a vehicle illustrating the disposition of the attachment with respect to standard parts of the vehicle.

Attention is first invited to Figure 2. There is a battery 10 grounded as at 12 and having a wire 14 extending therefrom. This wire is the standard battery lead which connects to the battery terminal and which is appropriately arranged in conjunction with the ammeter 16 of the vehicle. The ignition switch 18 is connected in the circuit which is formed in part by the wire 14, this much of the system being standard. Attached for control to the ignition switch 18 is an electrical conductor 20 having the electromagnetic motor, preferably an electromagnet 22 therein. Located in the conductor extension 21 of conductor 20 is a normally open switch 24. The ignition switch is, of course, connected to an ignition spark coil which is in turn connected between conductor 20 and the coil ground as is conventional when applying attachments to vehicles operable through the ignition circuit, so that the ignition circuit is not interrupted.

The switch 24 is located in the seat 25 of the vehicle and is so arranged that when a person is seated upon said seat the switch 24 is closed thereby allowing current to flow through the conductor 20 and extension 21 and thereby energizing the electromagnet 22.

The electromagnet 22 is mounted on a bracket 26 which is located beneath the floor board 27 of the vehicle and in such position that the electromagnet attracts the crank 28. A plate 30 is fixed to the crank 28 to constitute an attractive surface for the electromagnet to attract.

As shown in Figure 3 the crank 28 is passed through an opening 32 in the floor board or fire wall of the vehicle and is pivoted to a bracket 34 near the opening 32. The part 29 of the crank which projects through the opening 32 is adapted to be foot operated. The opposite end of the crank is provided with a hook or fork 36 arranged to embrace a part of the accelerator linkage 38.

A stop 40 is fixed to this linkage and is in such position that when the fork is disposed below the stop the link to which the stop is attached cannot be pushed to cause the throttle of the vehicle to be opened.

There is a spring 42 secured at one end to the crank 28 and fixed at the other end to a mounting bracket 44. This mounting bracket is carried by a suitable part of the vehicle, for example the fire wall, and the spring has for its purpose to oppose the pivotal operation on the crank 28.

In operation it is first necessary that the ignition switch be turned to such position that the vehicle may become operative. Then with the switch 24 normally opened, the electromagnet is inoperative and ineffectual. Under this condition the spring 42 retains the fork 36 in the position disclosed in Figure 3 whereby the accelerator pedal 46 cannot be depressed.

When the operator of the vehicle actuates the switch 24, the circuit having the electromagnet 22 is closed. Then the crank operator which consists of the part of the crank projecting through the opening 32 is actuated by the toe of the driver's shoe causing the crank to be moved against the electromagnet and held by magnetic attraction. Since the fork 36 is separated from the stop 40, normal and free operation of the accelerator pedal 46 is not impeded.

As soon as the circuit of the electromagnet is broken the spring 42 returns the crank 28 to such position (Figure 3) that the fork 36 engages under the stop 40 preventing movement of the pedal 46. The fork 36 accordingly, will remain in such position as to prevent the rod 38 from being operated until such time that the crank operator is actuated by the vehicle operator's shoe toe.

Having described the invention, what is claimed as new is:

An attachment for a vehicle having an ignition circuit, a floor board, a seat, an accelerator pedal mounted on said floor board forwardly of said seat, and a throttle stem extending through said floor board secured at its upper end to and actuated by said pedal; said attachment comprising a crank pivoted to said floor board intermediate its ends adjacent to and forwardly of said pedal, one end of said crank embracing said throttle stem beneath said floor board and the other end of said crank terminating forwardly of said pedal above said floor board, an electro-magnet mounted on the underside of said floor board adjacent said one end of said crank in the plane of the path of movement of said one end, a normally open switch mounted in the seat of the vehicle and adapted to be closed by the positioning of weight on the seat, an electric circuit magnetizing said magnet and tied into the ignition circuit, pivotal movement of said crank about said other end away from said pedal drawing said one end thereof out of embracing engagement with the throttle stem and into engagement with said electro-magnet, the closing of said switch energizing said magnet and maintaining said one end of said crank out of engagement with said throttle stem.

EARL L. HAYNIE.

References Cited in the file of this patent

UNITED STATES PATENTS

| Number | Name | Date |
|---|---|---|
| 741,837 | Sachs | Oct. 20, 1903 |
| 1,235,423 | Boyett | July 31, 1917 |
| 1,254,349 | Patch | Jan. 22, 1918 |
| 1,283,417 | Miller | Oct. 29, 1918 |
| 1,956,978 | Nafziger | May 1, 1934 |
| 2,015,835 | Banker | Oct. 1, 1935 |
| 2,248,747 | Dick | July 8, 1941 |
| 2,471,690 | Howland | May 31, 1949 |

FOREIGN PATENTS

| Number | Country | Date |
|---|---|---|
| 265,702 | Great Britain | Feb. 17, 1927 |